(12) United States Patent     (10) Patent No.:   US 12,613,379 B2

Bradley     (45) Date of Patent:    Apr. 28, 2026

(54) SPLICE-ON OPTICAL CONNECTORS FOR MULTICORE FIBERS

(71) Applicant: OFS Fitel, LLC, Norcross, GA (US)

(72) Inventor: Kelvin B Bradley, Lawrenceville, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 17/948,378

(22) Filed: Sep. 20, 2022

(65) Prior Publication Data

US 2023/0086950 A1     Mar. 23, 2023

Related U.S. Application Data

(60) Provisional application No. 63/246,207, filed on Sep. 20, 2021.

(51) Int. Cl.
*G02B 6/38*     (2006.01)

(52) U.S. Cl.
CPC ......... *G02B 6/3846* (2013.01); *G02B 6/3871* (2013.01); *G02B 6/3885* (2013.01)

(58) Field of Classification Search
CPC ........................... G02B 6/3846; G02B 6/3871
See application file for complete search history.

(56) References Cited

U.S. PATENT DOCUMENTS

| | | | | |
|---|---|---|---|---|
| 2002/0085815 A1* | 7/2002 | Shinagawa | .......... | G02B 6/3871 |
| | | | | 385/60 |
| 2004/0105625 A1* | 6/2004 | Ueda | .................... | G02B 6/3851 |
| | | | | 385/78 |
| 2011/0229085 A1* | 9/2011 | Bradley | ............... | G02B 6/3871 |
| | | | | 29/857 |
| 2013/0044978 A1* | 2/2013 | DeDobbelaere | ..... | G02B 6/3851 |
| | | | | 385/33 |
| 2014/0064665 A1* | 3/2014 | Ott | ........................ | G02B 6/2551 |
| | | | | 385/60 |
| 2014/0369648 A1* | 12/2014 | Nielson | ................ | G02B 6/3874 |
| | | | | 385/72 |
| 2018/0267243 A1* | 9/2018 | Nhep | .................... | G02B 6/3889 |
| 2023/0014659 A1* | 1/2023 | Corrado | ............... | G02B 6/2551 |

* cited by examiner

*Primary Examiner* — Michael Stahl

(57)        ABSTRACT

An optical connector for terminating a cable containing one or more multicore fibers. The connector has a plug housing, a ferrule disposed inside the housing, a rotatable frame, and a multicore fiber (MCF) stub having a length of a first MCF a portion of which is fixed inside the ferrule so that a first endface of the fiber is exposed at the front end of the ferrule. An opposite endface of the first MCF is cleaved for fusion splicing to a second MCF in the cable to be terminated. The ferrule also has a flange, and the frame is formed to engage the flange for rotation so that cores in the first MCF can be aligned and positioned in a prescribed orientation relative to the plug housing, and cores in the second MCF can be aligned with corresponding cores in the first MCF when the first and the second MCFs are fusion spliced to one another.

8 Claims, 3 Drawing Sheets

MCF
CABLE
24

12

ARAMID/JACKET
CLAMP
18

22

CLEAVED
MCF STUB
15

CABLE
SUPPORT
20

ARAMID
YARN

SPLICE
PROTECTOR
16

CONNECTOR
PLUG ASSEMBLY
14

46

30

CLEAVED
MCF STUB
40

FERRULE
(POLISHED)
34

PLUG
HOUSING
32

ROTATABLE
FRAME
44

SPRING
42

40a

BUFFER
TUBING
38

FERRULE
FLANGE
36

34a

CABLE CONTAINING
TWO 6-CORE MCFs

SPLICE-ON OPTICAL CONNECTORS FOR MULTICORE FIBERS

CROSS REFERENCE TO RELATED APPLICATION

This application claims priority under 35 U.S.C. § 119(e) of U.S. Provisional Patent Application No. 63/246,207 filed Sep. 20, 2021, titled Splice-On Connectors for Multicore Optical Fibers, the entire contents of which are incorporated herein by reference.

BACKGROUND OF THE INVENTION

Field of the Invention

The present invention concerns connectors for optical cables, and particularly to connectors for cables containing multicore optical fibers.

Discussion of the Known Art

U.S. Pat. No. 10,859,772 discloses a method of connecting lengths of a multicore optical fiber to one another, so that a defined pair of cores in a first length of the fiber will connect to a corresponding defined pair of cores in a second length of the fiber. The first and the second lengths are each terminated at one end in a multicore connector, and are then mated to one another via a connector adapter. See also U.S. Patent Application Publication No. 2021/0088729 (Mar. 25, 2021), and U.S. Pat. No. 9,535,221 (Jan. 3, 2017) which discloses an ultra-high density multicore fiber (MCF) distribution module including a number of MCF connector adapters.

U.S. Pat. No. 8,801,301 (Aug. 12, 2014), U.S. Pat. No. 9,366,828 (Jun. 14, 2016), and U.S. Pat. No. 9,535,221 (Jan. 3, 2017) disclose the termination of a multicore fiber by epoxying an end of the fiber into a ferrule of a connector assembly, cleaving the fiber flush with the ferrule endface, polishing the cleaved fiber, and then performing a passive or active alignment of the fiber cores by rotating the ferrule about its axis inside the housing of the connector assembly.

Fusion splice-on connectors (SOCs) for single core fibers are also known. See, e.g., U.S. Pat. No. 7,860,363 (Dec. 28, 2010) which discloses an optical connector kit that facilitates relatively fast field termination of standard fibers. A short length of a single core fiber is fixed within the ferrule of a standard type (e.g., SC, MU, FC, or ST) connector, and the ferrule including the front end of the fiber is polished. The rear end of the connectorized short length fiber and the front end of another fiber, are then prepared to be fusion spliced to one another. A variant of the SOC of the '363 patent is marketed by OFS Fitel, LLC, under the registered mark "EZ!Fuse" ®. None of the known SOCs are configured to facilitate a relatively easy and quick termination of multicore fibers in the field, however.

Moreover, while the routing technique disclosed in the mentioned '772 patent for multiple lengths of multicore fibers is viable for routing optical signals between data transceivers in optical links, it requires the MCFs to be broken or fanned out into pairs of single core fibers, so that defined pairs of the single core fibers can connect to corresponding pairs of receive (Rx) and transmit (Tx) terminals of data transceivers linked to one another in an optical network. Thus, a more cost effective and economical approach is needed if the use of multicore fibers in optical networks is to become widely accepted.

SUMMARY OF THE INVENTION

According to the invention, an optical connector for terminating a cable containing one or more multicore fibers, features a plug housing having a front end and a back end, a ferrule disposed within the housing so that a front end of the ferrule is positioned at the front end of the housing, and a rotatable frame formed and arranged to snap into the back end of the housing.

A multicore fiber (MCF) stub includes a length of a first MCF a portion of which is fixed inside the ferrule so that a first endface of the MCF is exposed to be polished at the front end of the ferrule, and a second endface of the MCF opposite the first endface is cleaved so as to be in condition for fusion splicing to a second MCF contained in the cable to be terminated.

The ferrule also has a flange, and the frame is constricted and arranged to engage the flange for rotation so that cores contained in the first MCF can be aligned in a prescribed orientation relative to the plug housing, and cores contained in the second MCF can be aligned with corresponding cores in the first MCF when the first and the second MCFs are fusion spliced to one another.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

Embodiments of the inventive optical connector disclosed herein enable cables containing one or more multicore fibers (MCFs) to be terminated quickly and easily in the field. The connectors may be used to terminate high capacity cables containing multiple MCFs, and to produce MCF patchcords. In particular, for optimal optical performance and speed of installation, the connectors are configured in the form of fusion splice-on connectors (SOCs).

Figures 1, 2:
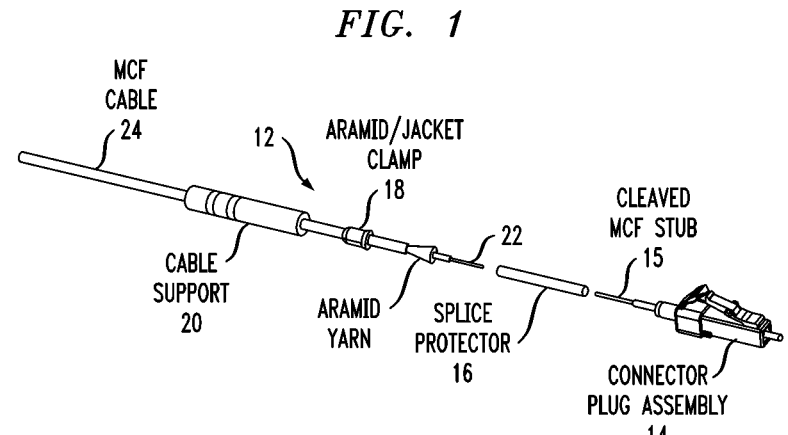
FIG. 1 is an exploded view of a first embodiment of a multicore fiber (MCF) optical connector according to the invention.
FIG. 2 is an exploded view of a plug assembly in the connector in FIG. 1.

FIG. 1 is an exploded view of a first embodiment of a rugged MCF connector 12 in the form of a type LC plug and configured as a SOC, according to the invention. The connector 12 includes a connector plug assembly 14 having a cleaved MCF stub 15 exiting from a back end of the assembly 14, a splice protector 16, an aramid/jacket clamp 18, and a cable support 20. For terminating a buffered fiber 22 in a MCF cable 24, the cable support 20 may be configured for, e.g., 900 um buffered fiber.

An advantage of the connector 12 with respect to conventional components (e.g., a pigtail), is the robustness and versatility of the assembled connector. For example, the connector 12 may be arranged and sized to attach directly to an aramid yarn strength member in a cable, and thus gain improved mechanical strength. Also, the splice joint is mechanically protected inside the cable support 20 after the cable fiber 22 is spliced to the cleaved MCF stub 15, the splice protector 16 is slid over the splice joint, and the cable support 20 is joined to the back end of the plug assembly 14.

FIG. 2 is an exploded view of the connector plug assembly 30 (14 in FIG. 1). The assembly 30 includes a plug housing 32, a polished ferrule 34 having a ferrule flange 36, buffer tubing 38 surrounding a length of MCF that exits from the flange 36, a cleaved MCF stub 40, a spring 42, and a rotatable frame 44 constructed and arranged to snap into a back end of the plug housing 32 to capture the spring 42, stub 40, tubing 38, and ferrule flange 36.

The rotatable frame 44 features axially projecting keys 46 that engage corresponding keyways (not shown) in the ferrule flange 36, thus allowing a desired rotational alignment and positioning of the cores within the MCF stub 40 relative to the plug housing 32. The MCF stub 40 may be polished at the front end 34a of the ferrule 34, and precleaved at the distal end 40a of the stub 40.

Figure 3:
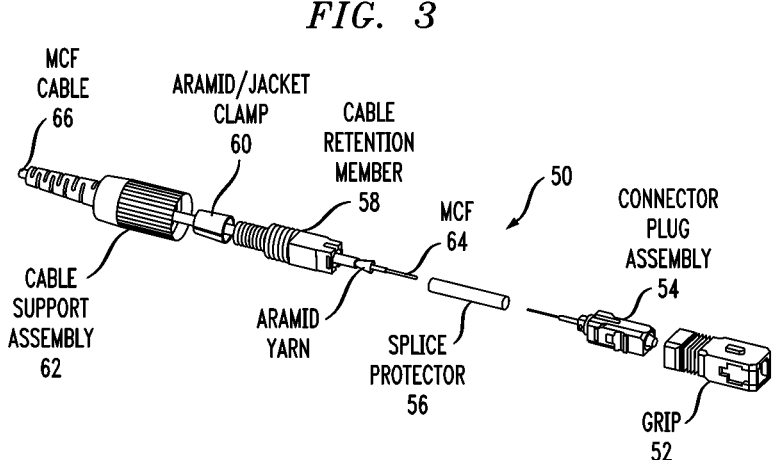
FIG. 3 is an exploded view of a second embodiment of a MCF optical connector according to the invention.

FIG. 3 is an exploded view of a second embodiment of a rugged MCF splice-on connector 50 according to the invention. The connector 50 is in the form of an SC-type connector, and includes a front grip 52, a connector plug assembly 54, splice protector 56, cable retention member 58, aramid/jacket clamp 60, and cable support assembly 62. For termination of a 900 um buffered fiber 64 contained in a MCF cable 66, an integrated cable-retention/boot assembly (not shown) may be employed.

Figure 4:
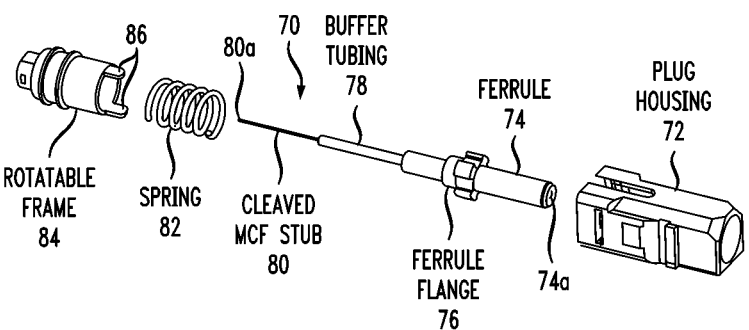
FIG. 4 is an exploded view of a plug assembly in the connector in FIG. 3.

FIG. 4 is an exploded view of the connector plug assembly 70 (54 in FIG. 3). The assembly 70 includes a plug housing 72, a ferrule 74 having a ferrule flange 76, buffer tubing 78, a MCF stub 80, a spring 82, and a rotatable cylindrical frame 84 that is formed and arranged to snap into the back end of the plug housing 72 and to capture the spring 82, the stub 80, tubing 78, and ferrule flange 76.

The rotatable frame 84 features axially projecting keys 86 that are formed to engage corresponding keyways (not shown) in the ferrule flange 76, thereby allowing a desired rotational alignment and positioning of the MCF cores relative to the plug housing 72. The MCF stub 80 of the connector 50 may be polished at the front end 74a of the ferrule 74, and pre-cleaved at the distal end 80a of the stub 80.

When the inventive optical connectors are produced, a stub of bare MCF is epoxied or otherwise fixed within the connector ferrule, cleaved, and polished. The ferrule flange containing the stub is then rotated by the frame (44 or 84) to position the cores visually in a prescribed alignment relative to the plug housing (32 or 72). Alternatively, an active alignment method could be used.

Once the cores within the MCF stub are in the desired orientation, the rotational alignment of the ferrule flange relative to the plug housing is then fixed. See, e.g., U.S. Pat. No. 8,801,301 (Aug. 12, 2014) all relevant portions of which are incorporated by reference. After the MCF stub is aligned relative to the plug housing, the distal or back end of the stub is stripped of its buffer tubing and cleaved at a prescribed length to prepare the stub for splicing to an another MCF in an outside cable to be terminated.

As mentioned, the MCF stub of the inventive connectors and the MCF in the cable to be terminated, must have their respective cores properly aligned with one another at the splice joint to ensure proper routing of optical signals. Also, many MCFs have markers embedded in the fiber cladding along the length of the fiber, which markers can be viewed readily when the MCF stub of the inventive connectors is to be fusion spliced to the MCF in the cable. The markers are created by inserting a glass rod with a different index of refraction into the fiber preform prior to drawing the perform to produce the MCF, and they can assist in bringing the cores into a desired rotational alignment prior to fusing. See, e.g., U.S. Pat. No. 9,164,234 (Oct. 20, 2015) which is incorporated by reference.

Figure 5:
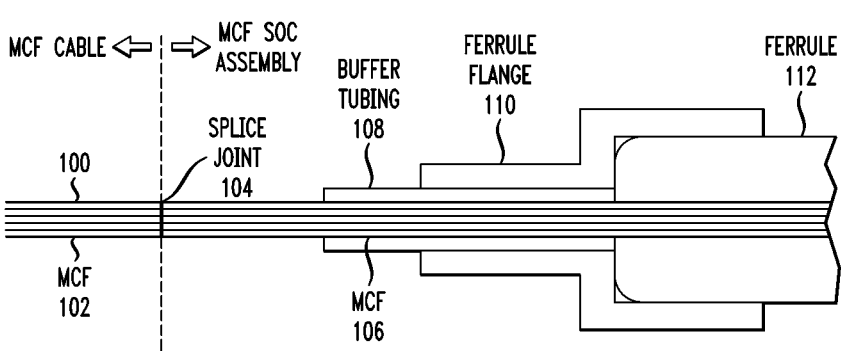
FIG. 5 shows an example of a termination of a MCF cable with a MCF optical connector according to the invention.

FIG. 5 illustrates an exemplary field termination of a cable 100 containing a MCF 102 via one of the inventive connectors. The figure shows the MCF 102 on the cable side, a splice joint 104, a MCF stub 106 in the inventive connector, buffer tubing 108 left on the MCF of the stub 106 after a length of the tubing 108 is stripped off the fiber, a ferrule flange 110, and the back end of a ferrule 112. As noted above, the ferrule is polished at its leading end, and the exposed MCF 106 exiting the buffer tubing 108 is pre-cleaved at its distal end.

Once a field splice is performed at the joint 104, the splice may be protected using a small, commercially available splice protector. Remaining connector components may then be assembled with one another to complete the installation.

Figure 6:
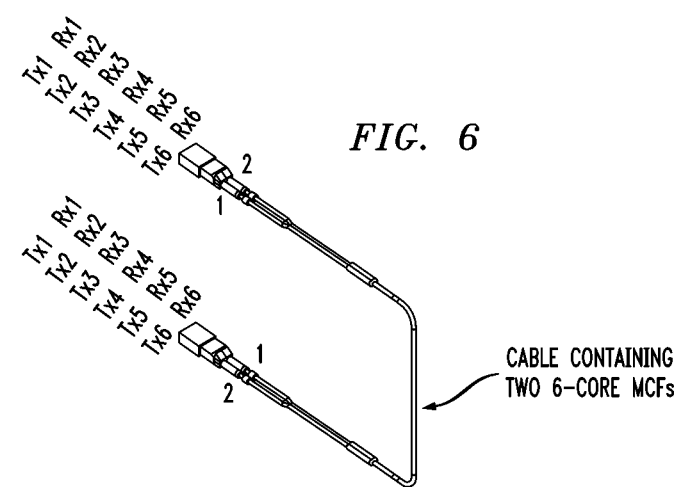
FIG. 6 shows an example of the use of MCF optical connectors according to the invention, to connect a cable containing two six-core MCFs to 2D optical devices.

As shown in FIG. 6, using MCF splice-on connectors according to the invention to terminate a cable containing a number of (e.g., two) MCFs in a data link, can allow the cables to be directly connected to 2D-array transceivers in the link, thus eliminating the need for a MCF fanout and reducing deployment costs. See U.S. Pat. No. 8,801,301 (Aug. 12, 2014), which is incorporated by reference, which describes examples of 2D optical devices that could be utilized in such a link.

The use of silicon-photonics-based devices like those mentioned in U.S. Pat. No. 11,099,341 (Aug. 24, 2021), which is incorporated by reference, is also feasible for launching signals into the MCFs. Alternatively, the connectors of the present invention could be used in cross-connect configurations, wherein connections between cables that are terminated with the inventive MCF splice-on connectors could be made at a patch panel. In either case, the inventive connectors allow a significant increase in patching density (i.e., saves space) by eliminating the use of single core connectors for single core fibers.

While the inventive optical connectors are illustrated herein as having LC and SC-type plug housings, it will be understood that other connector types such as, without limitation, MU, FC, CS, MPO (with standard through-hole MT ferrules or lensed multifiber ferrules), and other simplex or multifiber variants may be employed according to the invention. Also, while the connectors disclosed herein are suitable for termination of jacketed cable with aramid-yarn strength members, the exemplary embodiments may also be applied to other cabled fiber configurations like, for example, buffered fibers, ribbonized fibers, rollable ribbons, and the like. In addition, it should be noted that aspects of the invention described herein may also be practiced with MCFs having different types of cores, such as multimode or single-more cores. A procedure for splicing a pre-cleaved distal end of a MCF splice-on connector according to the invention, to a stripped MCF exiting a given cable, may proceed, without limitation, as follows.

1. Position the two multicore fibers in axial alignment so that end faces of the fibers confront one another.

2. Using a commercially available, camera-equipped, profile-alignment system (PAS) fusion splicer, rotate one or both of the fibers about their axes to produce one or more side view images of end regions of the aligned fibers. The images include side views of the fiber cores and other structures (e.g., markers) contained in the fibers. See U.S. Pat. No. 9,164,234 (Oct. 20, 2015), which is incorporated by reference.

3. Obtain two side view images of the end region of each of the aligned fibers, including a view looking in an X or horizontal direction normal to the fiber axis, and a view looking in a Y or vertical direction normal to the fiber axis.

4. Obtain a brightness profile of a given side view image of each fiber at a known axially offset position from the fiber endface.

5. Rotate one or both fibers about the axes of the fibers until the brightness profiles obtained for the fibers indicate that certain ones of the cores or other structures contained in the fibers are aligned with one another, or misaligned if prescribed, at the offset position of the profiles. In this way, the PAS can be programmed to align the fibers in a desired orientation to ensure proper signal routing.

6. Once the cores or other structures are in the desired alignment, fusion splice the fibers to one another.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

I claim:

1. An optical connector for terminating a cable containing one or more multicore fibers, comprising:

a plug housing having a front end and a back end;

a ferrule dimensioned and arranged to be positioned within the plug housing so that a front end of the ferrule is positioned at the front end of the housing;

a multicore fiber (MCF) stub including a certain length of a first MCF, wherein a portion of the first MCF is fixed inside the ferrule so that a first endface of the MCF is exposed to be polished at the front end of the ferrule;

a second endface of the MCF opposite the first endface is cleaved so that the second endface is in condition to be fusion spliced to a second MCF contained in a MCF cable that is to be terminated by the optical connector;

a frame dimensioned and formed to snap into a back end of the plug housing; and wherein the ferrule has a flange, and the frame is arranged to engage the flange for rotation, so that cores contained in the first MCF can be aligned and positioned in a determined orientation with respect to the plug housing, and cores contained in the second MCF can be aligned with corresponding cores in the first MCF when the first and the second MCFs are fusion spliced to one another.

2. An optical connector according to claim 1, wherein the frame has a number of axially projecting keys, and the flange of the ferrule has corresponding keyways for engaging the keys of the frame.

3. An optical connector according to claim 1, including a determined length of buffer tubing disposed about the first MCF.

4. An optical connector according to claim 1, including a splice protector dimensioned and arranged to be disposed about a splice joint produced between the first and the second MCFs.

5. An optical connector according to claim 1, wherein the connector has the configuration of an LC-type connector.

6. An optical connector according to claim 1, wherein the connector has the configuration of an SC-type connector.

7. A multicore fiber (MCF) patchcord comprising a length of an optical cable containing a multicore fiber, and an optical connector according to claim 1 installed at each end of the cable to terminate the fiber.

8. An optical cable containing two or more MCFs, and a corresponding number of optical connectors according to claim 1 installed at each end of the cable to terminate the fibers.

* * * * *